though it is preferred to carry out the reaction in an inert
3,534,042
2-PIPERAZINYL-2H-INDAZOLES
Ernest F. Le Von, Evanston, Ill., assignor to G. D. Searle & Co., Chicago, Ill., a corporation of Delaware
No Drawing. Filed Feb. 9, 1968, Ser. No. 704,261
Int. Cl. C07d 51/70
U.S. Cl. 260—268      4 Claims

ABSTRACT OF THE DISCLOSURE 2H-indazoles having a 1-piperazinyl substituent at the 2-position are described herein. They possess anti-inflammatory, anti-fungal, anti-protozoal, anti-algal, and anti-bacterial activity. The compounds are prepared by the cyclization of the appropriate 1-(2-azidobenzylidene-amino)piperazine.

SUMMARY OF THE INVENTION

The present invention relates to a group of 2H-indazoles having a piperazine substituent. In particular, it relates to a group of compounds having the following general formula

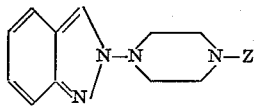

wherein Z is selected from the group consisting of hydrogen, lower alkyl, lower alkanoyl, (lower alkoxy)carbonyl, phenyl, and —CHXY, wherein X is selected from the group consisting of hydrogen and phenyl and Y is selected from the group consisting of phenyl, halophenyl, and tolyl; and quaternary salts of the aforesaid compounds.

The lower alkyl radicals referred to above contain up to 6 carbon atoms and can be exemplified by methyl, ethyl, propyl, isopropyl, butyl, and the like. The lower alkoxy radicals referred to above likewise contain up to 6 carbon atoms and can be exemplified by methoxy, ethoxy, propoxy, and the like. Similarly, the lower alkanoyl radicals referred to above also contain up to 6 carbon atoms and they can be exemplified by radicals such as acetyl, propionyl, butyryl, and the like. The halophenyl radicals referred to above include fluorophenyl, chlorophenyl, bromophenyl, and iodophenyl.

The organic bases of this invention form pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl bromide and iodide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of the present invention are conveniently prepared from the appropriate hydrazone having the following formula

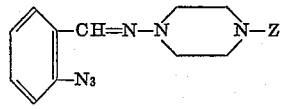

wherein Z is defined as above. The present 2H-indazoles are obtained by heating the indicated hydrazone. The hydrazone can be heated itself without any diluent although it is preferred to carry out the reaction in an inert solvent such as dimethylformamide at reflux.

The intermediate hydrazones referred to above are prepared from 2-azidobenzaldehyde. This aldehyde can be reacted with the appropriate 1-aminopiperazine to give the hydrazone. It is also possible to react the aldehyde with the solution obtained from the reduction of the appropriate 1-nitrosopiperazine with zinc dust without isolating and purifying the 1-aminopiperazine obtained from the reduction.

The compounds of the present invention are useful because of their pharmacological properties. In particular, the present compounds possess anti-inflammatory activity. Thus, they have a phenylbutazone-like effect on edematous conditions. The anti-inflammatory utiliy of the present compounds is demonstrated by the results of a standard test which determines their capacity to inhibit the edema induced in rats by injection of carrageenin. The procedure is a modification of one described by Winter et al., Proc. Soc. Exper. Biol. and Med., 111, 544 (1962). A compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 gm. A like group of rats is concurrently administered the same vehicle alone and it serves as controls. Precisely one hour later, each animal is injected under the plantar surface of each hind foot with 0.1 ml. of an aqueous 1% solution of carrageenin (Marine Colloids, Inc., Type 402). A compound is considered anti-inflammatory if the average total circumference of the two hind feet treated therewith, which is measured in arbitrary units five hours after the carrageenin injection, is significantly ($P \leq 0.05$) less than the corresponding value for the control group. Thus, subcutaneous administration of 25 mg. of 2-(4-methyl-1-piperazinyl)-2H-indazole, 2-(4-carbethoxy-1-piperazinyl) - 2H - indazole, and 2 - (4-benzhydryl-1-piperazinyl) - 2H - indazole each produced an anti-inflammatory effect when tested in the manner described above.

The present compounds also possess anti-biotic activity against a variety of organisms. Thus, they inhibit the growth of protozoa such as *Tetrahymena gelleii*, fungi such as *Trichophyton mentagrophytes*, and algae such as *Chlorella vulgaris*. The present compounds can thus be combined with various known excipients and adjuvants in the form of dusts, solutions, suspensions, ointments, and sprays to provide compositions useful for disinfecting purposes.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1A

A solution of 1 part of 2-aminobenzaldehyde oxime in 12 parts of concentrated hydrochloric acid is cooled in an ice bath and a solution of 0.5 part of sodium nitrite in 2.5 parts of water is added portionwise while the temperature is maintained at about −6 to −2° C. Almost complete solution results and a cold solution of 23 ml. of 9.1 N potassium hydroxide is added slowly with cooling at 0° C. The mixture is allowed to stand at 0° C. and then warmed to about 15° C. The mixture is then diluted with water and steam distilled. The distillate is collected in an ice cooled receiver and the solid which forms is separated by filtration and dried. The solid obtained in this way is 2-azidobenzaldehyde and it melts at about 35° C.

In a variation of the above procedure, the steam distillation is carried out as above. The distillation is stopped to add toluene to the pot residue and steam distillation is resumed. The organic layer is then separated from the distillate and this solution of 2-azidobenzaldehyde is used in subsequent reactions without further purification.

EXAMPLE 1B

To 119 parts of ice cold concentrated hydrochloric acid there is added 15 parts of 2-aminobenzaldehyde oxime. An additional 60 parts of concentrated hydrochloric acid is then added and a solution of 7.7 parts of sodium nitrite in 30 parts of water is added portionwise while the temperature is maintained at −12 to −5° C. The mixture is then maintained at about 0° C. while it is made alkaline by the slow addition of 200 parts of ice cold 25% aqueous sodium hydroxide. The resultant slurry is diluted with 100 parts of water and 100 parts of toluene and then warmed slowly to 10° C. during 45 minutes. The mixture is then stirred vigorously and heated rapidly to reflux. It is kept at reflux for a few minutes before it is cooled, mixed with charcoal, and filtered. The toluene layer is then separated, washed with water, dried over sodium sulfate, and again treated with charcoal. The resulting solution of 2-azidobenzaldehyde is then stored at 0° C. until needed. It can be used without further purification.

EXAMPLE 2

A solution of 0.2 part of 2-azidobenzaldehyde and 0.4 part of 1-amino-4-benzhydrylpiperazine in 12 parts of ethanol is allowed to stand at room temperature. The evaporation of some of the solvent causes crystallization to take place. The resultant precipitate is separated by filtration and washed with ethanol and hexane and then dried. The solid is then heated in about 15 parts of ethanol and the mixture is cooled. The precipitate which forms is separated by filtration and washed and then dried under vacuum. The product thus obtained is 1-(2-azidobenzylideneamino)-4-benzhydrylpiperazine melting at about 147–151° C.

0.17 part of 1-(2-azidobenzylideneamine)-4-benzhydrylpiperazine is heated at 150–155° C. in an oil bath for 15 minutes. A brown glass forms on cooling and this is triturated with ether. A colorless crystalline solid forms and this is separated by filtration, washed, and dried. The product obtained in this way is 2-(4-benzhydryl-1-piperazinyl)-2H-indazole melting at about 174–175° C. This compound has the following formula

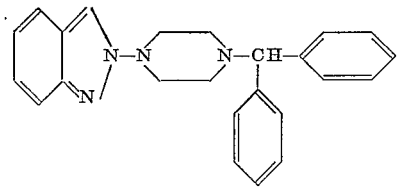

EXAMPLE 3

A mixture of 12 parts of 1-amino-4-(4-chlorobenzhydryl)-piperazine, 40 parts of ethanol, and 90 parts of a toluene solution containing 5.6 parts of 2-azidobenzaldehyde is prepared and a few drops of acetic acid is added. The mixture is allowed to stand at room temperature for about 30 minutes and then the solvent is evaporated under reduced pressure. The residual material is treated with hot ethanol and cooled and the solid is separated by filtration to give 1-(2-azidobenzylideneamine)-4-(4-chlorobenzhydryl)piperazine melting at about 149–153° C.

A solution of 12.3 parts of 1-(2-azidobenzylideneamino)-4-(4-chlorobenzhydryl)piperazine in 275 parts of dimethylformamide is refluxed for about 90 minutes. The solvent is evaporated under reduced pressure and the residue is recrystallized from a mixture of ethyl acetate and hexane to give 2-[4-(4-chlorobenzhydryl)-1-piperazinyl]-2H-indazole melting at about 136–138° C.

The addition of 5 mg. of this compound to 0.5 ml. of a broth inoculated with *Tetrahymena gelleii* inhibits the growth of this protozoa.

If the procedure of the first two paragraphs is repeated using 1-amino-4-(2-chlorobenzhydryl)piperazine, 1-amino-4-(4-fluorobenzhydryl)piperazine, and 1-amino-4-(4-methylbenzhydryl)piperazine in place of the 1-amino-4-(4-chlorobenzhydryl)piperazine, the corresponding substituted 2H-indazole is obtained in each instance.

EXAMPLE 4

11 parts of crude 1-amino-4-benzylpiperazine is added to the toluene solution obtained from the diazotization of 4.6 parts of 2-aminobenzaldehyde oxime according to the procedure described in Example 1B. A catalytic amount of acetic acid is added to the solution which is then refluxed for one hour in an apparatus equipped with a water trap. The toluene solution which results is washed with aqueous potassium carbonate and then with water. It is finally dried over potassium carbonate and the solvent is evaporated to leave a yellow syrup. This is recrystallized from 2-propanol to give 1-(2-azidobenzylideneamino)-4-benzylpiperazine melting at about 86–88° C.

A solution of 3.4 parts of 1-(2-azidobenzylideneamino)-4-benzylpiperazine in 190 parts of dimethylformamide is refluxed for 30 minutes. The solution is then cooled and the solvent is evaporated under reduced pressure. The residual brown oil is dissolved in 2-propanol and treated with charcoal. The precipitate which forms in the filtrate is separated by filtration and then washed and dried to give 2-(4-benzyl-1-piperazinyl)-2H-indazole melting at about 127–129° C.

EXAMPLE 5

A mixture of 9.0 parts of 1-amino-4-phenylpiperazine and about 7 parts of 2-azidobenzaldehyde in 90 parts of toluene, together with 3 drops of acetic acid, is prepared in the cold and allowed to warm to room temperature. The solvent is then evaporated under reduced pressure to leave a residual yellow solid which is recrystallized from 2-propanol to give 1-(2-azidobenzylideneamino)-4-phenylpiperazine melting at about 133–134° C.

A solution of 9.7 parts of 1-(2-azidobenzylidene amino)-4-phenylpiperazine in 475 parts of dimethylformamide is slowly heated to reflux under nitrogen and then maintained at that temperature for about 50 minutes. The mixture is then cooled under nitrogen and the solvent is evaporated under reduced pressure to leave a residual solid. This solid is dissolved in 450 parts of toluene and treated with charcoal and filtered. The filtrate is concentrated under reduced pressure about one-fifth the original volume. The mixture is then reheated to bring about solution and cooled slowly to permit crystallization. The precipitate which forms is separated by filtration and then washed with toluene and with hexane, and finally dried to give 2-(4-phenyl-1-piperazinyl)-2H-indazole melting at about 187–188° C.

EXAMPLE 6

About 120 parts of a toluene solution containing 8 parts of 2-azidobenzaldehyde is mixed with 10 parts of 1-amino-4-methylpiperazine monohydrochloride. 20 parts of water and 40 parts of ethanol are added and the mixture is stirred for 30 minutes. The mixture is further diluted with toluene and 10 parts of anhydrous potassium carbonate is added. The mixture is allowed to stand for one hour, the toluene is separated, and the aqueous slurry is extracted twice with toluene by decanting. The toluene solution is then dried over potassium carbonate and the solvent is evaporated. The resultant residue is 1-(2-azidobenzylideneamino)-4-methylpiperazine and it is dissolved in 200 parts of dimethylformamide. This solution is heated to reflux and maintained at that temperature, under nitrogen, for 40 minutes. The solvent is then evaporated and the residual dark syrup is dissolved in 150 parts of ethyl acetate and treated with charcoal. The ethyl acetate is then evaporated to leave a yellow residue which is crystallized from 30 parts of hexane to give 2-(4-methyl-1-piperazinyl)-2H-indazole melting at about 111–113° C.

The addition of 5 mg. of this compound to an agar plate inoculated with *Trichophyton mentagrophytes* inhibits the growth of this fungus. Likewise, the addition of 5 mg. of the compound to 0.5 ml. of a broth inoculated with *Tetrahymena gelleii* inhibits the growth of this protozoa.

If the procedure in the first two paragraphs above is repeated using 1-amino-4-ethylpiperazine in place of the 1-amino-4-methylpiperazine, the product is 2-(4-ethyl-1-piperazinyl)-2H-indazole.

EXAMPLE 7

A solution of 2.7 parts of 2-(4-methyl-1-piperazinyl)-2H-indazole in 95 parts of acetone is mixed with 13 parts of methyl iodide. In a few minutes, a precipitate forms. This is separated by filtration, washed, and then dried to give 2-(4-methyl-1-piperazinyl)-2H-indazole methiodide melting at about 245–246° C.

EXAMPLE 8

To a suspension of 13 parts of zinc dust in 110 parts of water and 110 parts of acetic acid, there is added portionwise a solution of 8.0 parts of 1-nitrosopiperazine in about 20 parts of water while the temperature is maintained at about 20–25° C. The mixture is then allowed to stand at 25° C. for one hour before it is filtered to remove the zinc and mixed with a solution of 5 parts of 2-azidobenzaldehyde in 90 parts of toluene. The mixture is then made alkaline by the portionwise addition of 135 parts of ammonium hydroxide and ice. The toluene solution is then separated and combined with a toluene extract and the combined toluene solutions are washed with water and dried over potassium carbonate and the solvent is evaporated to leave a yellow semi-crystalline residue. This is warmed in alcohol and combined with a hot solution of 5 parts of succinic acid in 40 parts of ethanol. The solution is cooled and the precipitate which forms is separated by filtration, washed with a mixture of ethanol and ether, and then dried to give the succinate salt of 1-(2-azidobenzylideneamino)piperazine melting at about 173–177° C.

9 parts of the succinic acid salt obtained in the preceding paragraph is slurried in a mixture of water and ether. Then, a mixture of 40 parts by volume of 10% aqueous sodium hydroxide and 60 parts of water is added. The mixture is shaken and the aqueous layer is separated. The ether solution is dried over potassium carbonate and the solvent is evaporated under reduced pressure to give 1-(2-azidobenzylideneamino)piperazine melting at about 63–75° C.

A solution of 5.3 parts of 1-(2-azidobenzylideneamino)piperazine in 240 parts of dimethylformamide is refluxed under nitrogen for about 50 minutes. The mixture is then cooled and the solvent is evaporated under reduced pressure to leave a residual orange-brown syrup. This syrup is treated with 100 ml. of hexane and caused to crystallize. The solid is separated by filtration and washed with hexane. It is 2-(1-piperazinyl)-2H-indazole.

EXAMPLE 9

To a suspension of 10 parts of zinc dust and 150 parts of 50% acetic acid there is added 8 parts of 1-carbethoxy-4-nitrosopiperazine portionwise. The temperature rises to about 31° C. The mixture is then allowed to stand for one hour before it is filtered to remove the zinc. Then, a solution of about 5 parts of 2-azidobenzaldehyde in 90 parts of toluene is added. 20 parts of ammonium hydroxide is added and the mixture is stirred for about 1 hour. An additional 70 parts of ammonium hydroxide is then added with ice to neutralize the mixture. The toluene solution is then separated and the aqueous layer is extracted with toluene. The combined toluene solutions are washed with water and dried over potassium carbonate and the solvent is evaporated under reduced pressure to leave a residual yellow oil which is crude 1-(2-azidobenzylideneamino)-4-carbethoxypiperazine.

The above oil is diluted with 285 parts of dimethylformamide and refluxed for 45 minutes under nitrogen. The mixture is then cooled and the solvent is evaporated under reduced pressure to leave a residual dark syrup. This is dissolved in 220 parts of toluene and the toluene solution is washed with water, dried over potassium carbonate, and heated with charcoal. The solvent is evaporated from the resultant solution to give a yellow oil. The oil is dissolved in a mixture of hexane and ether and then causes to crystallize. The precipitate which forms is separated by filtration, washed, and dried to give 2-(4-carbethoxy-1-piperazinyl)-2H-indazole melting at about 98–100° C. This compound has the following formula

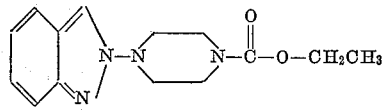

What is claimed is:
1. A compound of the formula

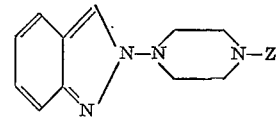

wherein Z is selected from the group consisting of hydrogen, lower alkyl, (lower alkoxy)carbonyl, phenyl, and —CHXY wherein X is selected from the group consisting of hydrogen and phenyl and Y is selected from the group consisting of phenyl, halophenyl, and tolyl.

2. A compound according to claim 1 which is 2-(4-methyl-1-piperazinyl)-2H-indazole.

3. A compound according to claim 1 which is 2-(4-carbethoxy-1-piperazinyl)-2H-indazole.

4. A compound according to claim 1 which is 2-(4-benzhydryl-1-piperazinyl)-2H-indazole.

References Cited

UNITED STATES PATENTS 3,329,680   7/1967   Hofmann et al. ____ 260—268
3,428,634   2/1969   Palazzo _____ 260—268 X DONALD G. DAUS, Primary Examiner U.S. Cl. X.R.

260—349, 566; 424—250